${}^{3,309,389}$ Patented Mar. 14, 1967

3,309,389
DECOLORIZING OF BEESWAX

Jonathan W. White, Jr., Ambler, Pa., assignor to the United States of America as represented by the Secretary of Agriculture
No Drawing. Filed Aug. 26, 1963, Ser. No. 304,743
6 Claims. (Cl. 260—424)

A non-exclusive, irrevocable, royalty-free license in the invention herein described, throughout the world for all purposes of the United States Government, with the power to grant sublicenses for such purposes, is hereby granted to the Government of the United States of America.

This invention relates to lightening the color of beeswax and has among its objects the elimination of color contributing factors which do not respond to conventional besswax decolorizing processes.

Beeswax, produced by various species of bees is a valuable article of commerce. In the United States, beeswax is obtained with honey as a co-product of beekeeping. The wax is obtained by the beekeeper, roughly separated from extraneous material and sold to refiners of beeswax who further process and purify it to an extent dictated by the type of wax received and the specific market use of the refined wax.

In general, two principal kinds of beeswax are received from the beekeeper, a light-colored higher quality wax obtained from comb cappings removed by the apiarist in the production of honey, and a lower-grade product made up of old brood comb, wax scraped from frames, and old extracting comb which has outlived its usefulness. Such wax is generally very dark in color and badly contaminated with extraneous materials.

The exact nature of colors of beeswax is not known. It is likely that they arise from propolis, a resinous plant material collected by bees, from pigments contained in pollen and to a lesser extent honey, and by oxidation of materials added by the bees. The treatment of the wax by the beekeeper can also darken it by overheating in equipment used to separate wax and honey, and by introducing metallic contamination by use of iron, zinc, copper, brass or Monel equipment.

It is frequently necessary for the wax processor to lighten the color of crude beeswax for various reasons. Use of oxidizing materials for this purpose is common, as is the treatment of the wax with acids and adsorbents such as activated carbon or mixtures of acid-treated alkaline earth and an alkaline earth oxide at elevated temperatures; sun-bleaching is also common.

Certain types of crude beeswax do not yield a satisfactory light color on application of the usual bleaching treatment. The colored impurities cannot be economically removed by established procedures and the product is of limited or negligible value.

According to the present invention liquid beeswax contaminated wih metal compounds is contacted with an aqueous solution of a metal sequestrant until the sequestrant has reacted with the metal compounds and beeswax, of a color lighter than that of the original beeswax, is separated from the reaction mixture.

Since metal-chelating sequestrant materials are generally water-soluble and the metallic soaps and other metal-holding materials in the wax are soluble in the wax and not in water, it is apparent that an intimate contact between the two phases must be created and maintained for a sufficient time to allow the reactions to take place. On heating a mixture of beeswax and water, the beeswax melts before the boiling temperature of the water is reached, forming two liquid phases. Different sources of beeswax melt at different temperatures. Hence, the operating temperature will be in the range of from the melting point of the beeswax, to the temperature at which the water boils, typically in a range of about 80–100° C. Mechanical agitation or other means of intimately mixing the hot liquid phases permits the metal-chelating reaction to occur. The rate of reaction may be enhanced by the addition of mutual solubilizing agents, emulsifiers, or inert solvents, but this is not necessary and the presence of the additives may result in extra operating steps to separate the wax. Under the operating conditions of the examples agitation with excess sequestrant for periods of longer than two hours did not further improve the color, so the rate of reaction with an aqueous solution of the sequestrant is a practical operation.

Although contributing impressively to the undesirable color of the beeswax, the metal compounds are typically present in trace amounts, a few one-hundreths of a percent or less, based on weight of the beeswax. The sequestrant is preferably added as a dilute aqueous solution, such as 0.005 M, although the concentration may vary over a wide range, such as 0.0005 M to 1 molar. The amount of sequestrant added will, for optimum results, be at least that needed to react with all the metal available for combining with the sequestrant so in practice an excess is added, although lesser amounts of sequestrant will serve to reduce the amount of color. A calculated amount of sequestrant solution can be combined in entirety at the beginning or added incrementally during the contacting period. When the beeswax is unusually contaimined it may be preferable to separate the beeswax from the aqueous solution and interfacial solids and repeat the process with fresh sequestrant solution.

The metal-chelating agent may be any material whose structure causes it to act as a sequestrant. Especially preferred are the sequestrants active for removal of iron and copper, such as the following materials and their sodium salts:

ethylene diamine tetraacetic acid
diethylene triamine pentaacetic acid
1,2-diamino-cyclohexane tetraacetic acid
amino triacetic acid
diacetic-dipropionic acid
amino diacetic monopropionic acid
amino diacetic acid
amino dipropionic acid
glycine propionic acid
2-amino benzoic diacetic acid
nitrilotriacetic acid The following examples are presented to illustrate the practice of the process of the invention, but are not intended to be in limitation thereof.

Example 1

Fifteen grams of a "green" beeswax were heated for two hours with mechanical stirring with 35 ml. of a 0.005 molar solution of di-sodium dihydrogen ethylene diamine tetraacetate. The mixture was kept between 80 and 100° C. during this time, then allowed to cool and the wax to solidify. The brown coagulated material on the underside of the wax cake was removed and the wax washed by stirring with water at 80° C. for a few minutes. The color was now found to be a natural yellow-orange, changing from (Munsell) 2.5y 5/6 to 2.5y 7/6.5.

Example 2

A dark brown-black wax was treated as follows: 15 gm. was heated for one hour with 35 ml. 0.005 molar disodium dihydrogen ethylene diamine tetraacetate as described in Example 1 above. On cooling, a black, granular material was removed from the underside of the wax. Titration of the aqueous solutions showed that the 15 gm. wax required 6.67 ml. of 0.005 M sequestrant solution to remove the metals therefrom, equivalent to 0.012% in the original wax, calculated as iron. The color was noted as Munsell 2.5y 5/5.

As a negative control for this example another 15 gm. sample of the same wax was treated as above but with water only. No black granular coagulum was obtained and the color of the wax remained dark, Munsell 2.5y 4/4.

*Example 3*

A batch of 2525 gm. crude dark commercial wax as received from the producer was agitated 1.3 hours at 90–95° C. with 5900 ml. distilled water containing 11.07 gm. disodium salt of ethylene diamine tetraacetic acid. A sample was removed after treatment but before solidification and filtered through paper. A sample of the original wax was also filtered. Colors were as follows: original wax 10 YR 3/4; filtered only, 10 YR 4/4; treated only, 10 YR 5/8; treated and filtered, 10 YR 6/8. The 2525 gm. wax required 1460 ml. .005 M sequestrant, equivalent to removal from the wax of metals (as iron) in the amount of 0.0162% of the wax.

*Example 4*

A 0.005 molar solution of nitrilotriacetic acid was adjusted to pH 4.5 with N/10 sodium hydroxide solution and 35 ml. was added to 15 grams of "green" beeswax. The mixture was heated with agitation for one hour at 90–100° C., then allowed to cool. The coagulum was removed and the beeswax washed as in Example 1. The treated beeswax was rated as Munsell 2.5y 7/6.5, a natural yellow-orange color.

The foregoing examples illustrate the marked reduction in color of dark-colored beeswax, especially the substantial removal of green and brownish hues. The colors remaining are those which typically respond to conventional decolorizing treatments. Alternatively, the dark-colored beeswax can be treated with adsorbents and other agents to remove the yellow-orange colors, followed by the process of the present invention, to obtain a light-colored beeswax.

I claim:
1. A process for reducing the color of beeswax containing a metal compound comprising contacting said beeswax as a liquid with an aqueous solution of a metal sequestrant until the sequestrant has reacted with said metal compound, and separating beeswax of a color lighter than that of the original beeswax from the reaction mixture.
2. The process of claim 1 in which the sequestrant is ethylene diamine tetraacetic acid.
3. The process of claim 1 in which the sequestrant is monosodium salt of ethylene diamine tetraacetic acid.
4. The process of claim 1 in which the sequestrant is disodium salt of ethylene diamine tetraacetic acid.
5. The process of claim 1 in which the sequestrant is nitrilotriacetic acid.
6. A process for reducing the color of beeswax containing a metal compound comprising forming a mixture of the beeswax with an amount of a 0.0005 M to 1 M aqueous solution of a metal sequestrant sufficient to react with all the metal available for combining with the sequestrant, heating the resulting mixture at a temperature of about from 80° to 100° C. to melt the beeswax and until the sequestrant has reacted with all the combinable metal, and separating beeswax of a color lighter than that of the original beeswax from the reaction mixture.

References Cited by the Examiner
UNITED STATES PATENTS
2,463,015  3/1949  Bersworth _____ 260—424

CHARLES B. PARKER, *Primary Examiner.*
JOSEPH P. BRUST, *Examiner.*
ANTON H. SUTTO, *Assistant Examiner.*